United States Patent Office 3,001,827
Patented Sept. 26, 1961

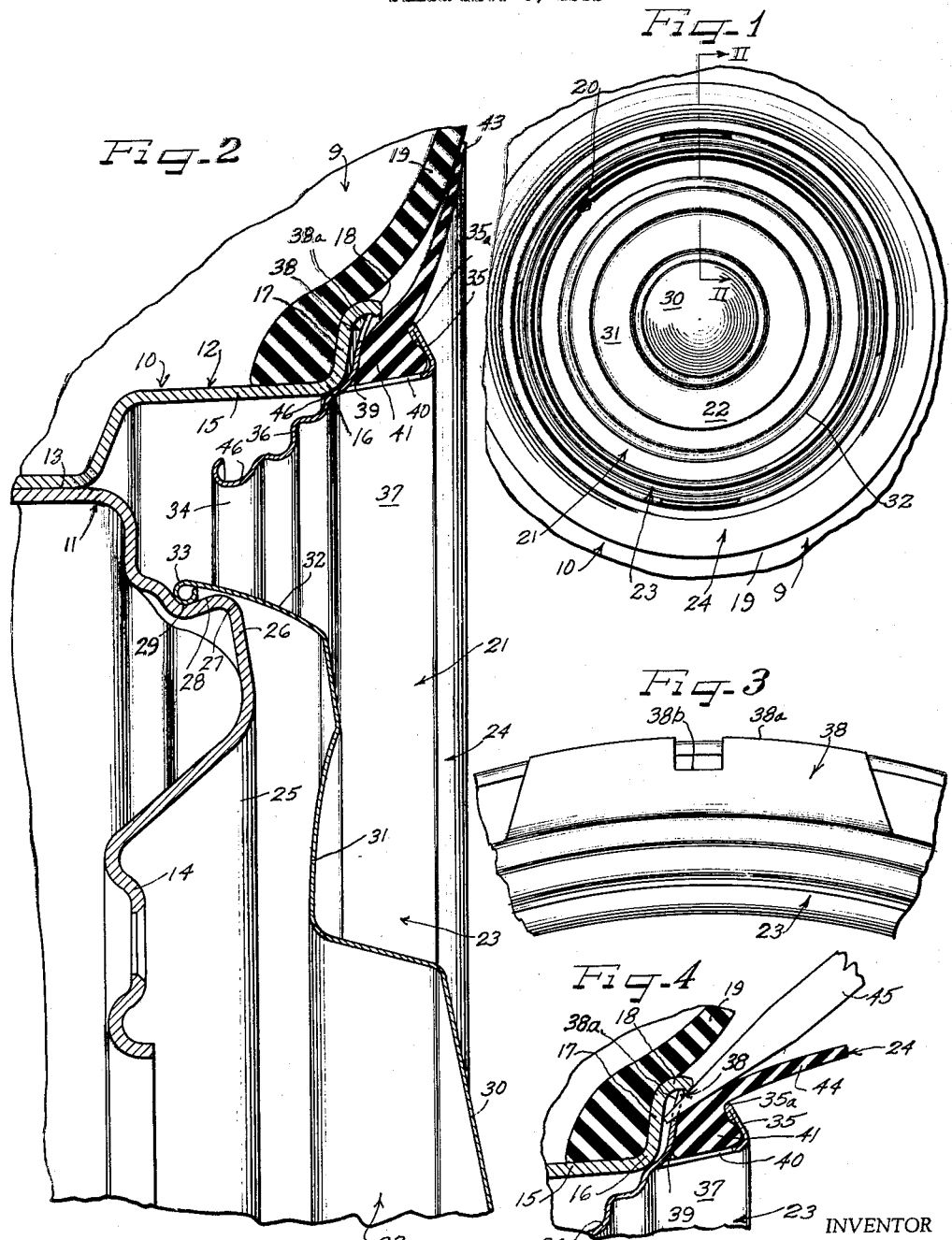

3,001,827
WHEEL AND TIRE TRIM ASSEMBLY
George Albert Lyon, 13881 W. Chicago Blvd.,
Detroit 28, Mich.
Filed Nov. 9, 1959, Ser. No. 851,669
11 Claims. (Cl. 301—37)

The present invention relates generally to wheel structures and more particularly to a cover structure for retained disposition upon the outer side of a vehicle wheel and which cover structure is not only adapted to protect the wheel but in addition is adapted to ornament the vehicle wheel.

In the motor car industry there has been a considerable demand for a new type of cover structure which is capable of concealing the rim and body parts including the terminal rim flange of the tire rim. Where a cover structure of the present type is used having a metallic cover or ring member and a synthetic ring member, the metallic ring member may be utilized to fasten itself as well as the synthetic ring to the wheel according to features of the present invention. The synthetic ring is adapted to bridge over the terminal rim flange to conceal it and it also covers a portion of the tire side wall. This synthetic ring may provide a very attractive contrast with respect to the metallic ring member since it may be colored in a wide range of colors and it may be colored to match the finish of the vehicle, if desired.

An important object of the present invention is to provide a cover structure including a cover member and a synthetic ring which cover member has new and improved means for retaining itself upon a wheel while at the same time retaining the synthetic ring on the wheel.

Another object of the present invention is to provide a simple way for the cover member and the ring member to be removed in unison from the wheel.

Still another object of the present invention is to provide a new and improved cover structure which may be economically manufactured on a large production basis at a minimum of expense.

According to the general features of the present invention there is provided a metallic ring member having an offset outer margin from which resiliently deflectable retaining extensions are struck out and turned away from the offset margin for engagement with the terminal rim flange of a vehicle wheel.

According to other features of the present invention the offset margin and the resiliently deflectable retaining extensions are so formed to provide a cover pocket area in which the inner margin of a synthetic ring is adapted to be secured in retained assembly with the metallic cover or ring member.

According to still further features of the present invention, the inner ring margin or the bead when engaged in assembly with the metallic ring member is adapted to abut against the resiliently deflectable extensions except at the terminal ends thereof so as to assist in the assembly of the ring member on the wheel by backing up the extensions as they are applied to the wheel leaving the terminal ends of the extensions free to flex axially relative to the inner ring margin of the synthetic ring.

According to still another feature of the present invention, the synthetic inner ring margin is of such a configuration that when the outer swingable synthetic ring portion is fulcrumed on the offset cover margin and moved axially outwardly, that a gap is left between the inner ring margin and the terminal rim flange into which a pry-off tool may be inserted and applied against the retaining extensions of the metallic ring or cover member to release the same so that the metallic cover member and the synthetic ring may be removed from the wheel.

Other objects and features of the present invention will more fully become apparent in view of the following detailed description taken in conjunction with the accompanying drawings illustrating therein a single embodiment and in which:

FIGURE 1 is a front elevation of a wheel structure, according to features of the present invention;

FIGURE 2 is an enlarged fragmentary cross-sectional view taken substantially on the line II—II looking in the direction indicated by the arrows, as shown in FIGURE 1;

FIGURE 3 is an enlarged fragmentary rear elevation of the metallic ring or cover member highlighting the configuration of the retaining extensions; and FIGURE 4 is an enlarged fragmentary cross-sectional view similar to FIGURE 2 only illustrating the manner in which the cover member and the synthetic ring may be removed from the wheel.

As shown on the drawings:

The reference numeral 9 indicates generally a wheel structure including a wheel 10. The wheel 10 is comprised of a body part 11 and a multi-flanged drop center type of tire rim 12 which is welded in assembly to the body part 11, as indicated at 13. The body part 11 is provided with a bolt-on flange 14 so as to enable the wheel 10 to be secured to the axle of a vehicle by means of suitable fasteners in a conventional manner. The tire rim 12 includes a generally axially extending intermediate rim flange 15, a rim shoulder 16, a radially outwardly extending rim flange 17, and a terminal rim flange 18. The rim shoulder 16 is disposed at the junction of the rim flanges 15 and 16.

Mounted upon the wheel and more particularly on the tire rim 12 is a tire 19 which may be either of the tube or tubeless type. The tire is adapted to be inflated by inserting air through a valve stem indicated at 20 in FIGURE 1.

According to the features of the present invention, a cover structure 21 is mounted on the wheel 10 to ornament the wheel and to protect it. The cover structure 21 includes an inner or central cover member 22, a metallic outer cover or ring member 23, and a synthetic ring 24.

The body part has a bulged area or nose portion 25 on which is provided circumferentially spaced cover retaining bumps 26. Each of the bumps 26 has a lead-in surface 27 and a generally radially and axially inwardly inclined surface 28 which leads into a cover retaining seat 29.

The inner metallic cover member 22 includes a central crown area 30, a generally radially outwardly extending intermediate section 31, and a generally axially inwardly extending outer margin 32 which terminates in a bead 33. The inner metallic cover member 22 may be assembled on the body part by engaging the bead 33 with the lead-in body part surface 27 and urging the cover member axially inwardly until the bead is flexed over the bumps 26 and is guided axially inwardly along the surfaces 28 into retained engagement in the seats 29.

The metallic cover or ring member 23 has been referred to herein as a metallic ring member or a metallic cover member. The metallic ring member 23 includes a radially inner ring margin 34, an offset radially outer cover margin 35, a generally radially outwardly extending cover portion 36, and a generally axially outwardly extending cover portion 37. The cover portions 36 and 37 operate to connect the radially inner and outer margins 34 and 35 to the other.

Circumferentially spaced resiliently deflectable retaining extensions 38 are struck out from the axially outwardly extending cover portion 37 in such a way that the radially inner end of each of the extensions extends radially from the generally radially outwardly extending cover portion 36 and the terminal end or edge 38a of the extension is deflected radially outwardly axially inwardly of the axially outwardly extending cover portion 37.

It will be noted that the retaining extensions 38 extend generally radially and axially outwardly whereas the outer cover margin 35 extends generally radially outwardly axially inwardly so that the extensions 38 and the outer cover margin 35 converge towards one another and cooperate with the axially outwardly extending cover portion 37 in defining a cover pocket area 39. While the extensions 38 are turned from cover slots or openings 40, the relative cut-out area is comparatively small so that the axial cover portion 37 provides a broad enough base for the receipt of the tire side wall simulating ring member with the cover pocket area 39.

The tire side wall simulating ring member 24 includes a radially inner thickened ring margin or bead 41 as well as a radially outer ring margin 43 which margins are connected together by a connecting ring section 44. The bead 41 is adapted to be retainingly engaged within the cover pocket area 39 to secure it in assembly with the ring or cover member 23. It will be noted that when the bead 41 is engaged in the cover pocket area that it is engaged along its radial extent against the extensions 38 except the terminal end 38a where it is spaced from the terminal or tip end 38a of the extensions to enable the terminals 38a to flex freely so that they may be engaged and disengaged with respect to the terminal rim flange 18. The bead 41 is also snugly engaged against the radially outwardly axially inwardly extending outer or offset ring margin 35 and is fulcrumed on the radially outer margin along its beaded edge 35a.

By fulcruming the ring member 24 on the outer cover member bead 35a the outer ring margin 43 and the connecting ring section 44 may be swingable together as a swingable portion away from the tire side wall 19 so that a pry-off tool 45 may be worked between the terminal rim flange 18 and the ring margin 41 in such a way that the tip of the tool may be engaged in a notched area 38b of the extensions. By applying a suitable force against the tool the extensions may be released from the terminal rim flange 18 to free the rings 23 and 24 from the wheel.

In order to reinforce the ring member 23, the radially outwardly extending portion 36 is undulated or ribbed at 46. When the cover or ring member 23 is engaged on the wheel one of these ribs 46 is bottomed against the rim shoulder 16.

To assemble the metallic ring 23 and the synthetic ring 42 on the wheel the ring bead 41 initially must be engaged in the cover pocket area 39. Then the ring members 23 and 24 are aligned with the wheel and the resiliently deflectable extensions 38 are flexed over the arcuately configured terminal rim flange 18 until the terminal ends of the extensions are engaged in edgewise retained assembly with the arcuate terminal rim flange 18. When the ring members 23 and 24 are engaged in assembly on the wheel, the ring member 23 is preferably bottomed against the rim shoulder 16 and the ring member 24 is preferably bridged over the terminal rim flange 18. The ring member is bridged over the terminal rim flange 18 in order to prevent it from rubbing against the terminal rim flange so that the synthetic ring member will not be damaged during operation.

While any suitable number of retaining extensions 38 may be used, the illustrated form of the invention contemplates the use of four extensions. The cover members 22 and 23 are preferably formed from a resilient material such as stainless steel while the ring member 24 is preferably formed from a synthetic material such as rubber or synthetic plastic or any other suitable material.

It will be understood that modifications and variations may be effected without departing from the scope of the novel concepts of the present invention.

I claim as my invention:

1. In a wheel structure including a tire rim having a radial rim flange as well as an axially extending terminal rim flange and a tire carried on the tire rim, a cover structure for retained disposition on the tire rim including a radially inner cover member and a tire side wall simulating ring member, the cover member having a generally radially outwardly extending cover portion terminating in an offset radially outer cover margin, the offset radially outer cover margin confronting the radial rim flange and being separated from the generally radially outwardly extending cover portion by an axially outwardly extending cover portion disposed at the radially inner end of said offset radially outer cover margin, and circumferentially spaced resiliently deflectable retaining extensions turned radially outwardly from the axially outwardly extending cover portion for cover retaining engagement with the terminal rim flange and concealed by said members, the ring member being bridged over the terminal rim flange and having a radially outer ring margin engaged against the tire and a radially inner thickened ring margin retainingly engaged in a cover pocket area defined by said extensions as well as said axial cover portion and said offset radially outer cover margin.

2. In a wheel structure including a tire rim having a radial rim flange as well as an axially extending terminal rim flange and a tire carried on the tire rim, a cover structure for retained disposition on the tire rim including a radially inner cover member and a tire side wall simulating ring member, the cover member having a generally radially outwardly extending cover portion terminating in an offset radially outer cover margin, the offset radially outer cover margin confronting the radial rim flange and being separated from the generally radially outwardly extending cover portion by an axially outwardly extending cover portion disposed at the radially inner end of said offset radially outer cover margin, and circumferentially spaced resiliently deflectable retaining extensions turned radially outwardly from the axially outwardly extending cover portion for cover retaining engagement with the terminal rim flange and concealed by said members, the ring member being bridged over the terminal rim flange and having a radially outer ring margin engaged against the tire and a radially inner thickened ring margin retainingly engaged in a cover pocket area defined by said extensions as well as said axial cover portion and said offset radially outer cover margin, said tire side wall simulating ring member being fulcrumed on the outer cover margin and with the outer ring margin being swingable axially away from the tire to expose said extensions and with each of said extensions having a notched area disposed radially inwardly of the terminal rim flange which notched area is adapted to be engaged by a pry-off tool to disassemble the ring member and the cover member from the tire rim.

3. A cover member for retained disposition on a tire rim of a vehicle wheel, the cover member having a generally radially outwardly extending cover portion terminating in an offset radially outer cover margin, the offset radially outer cover margin being adapted to confront a radially outermost radial rim flange of the tire rim and being separated from the generally radially outwardly extending cover portion by an axially outwardly extending cover portion disposed at the radially inner end of said radially outer cover margin, and circumferentially spaced resiliently deflectable retaining extensions turned radially outwardly from the axially outwardly extending cover portion for cover retaining engagement with a terminal rim flange of the tire rim and concealed by said offset radially outer cover margin, said extensions as well as said axial cover portion and said radially outer margin defining a cover pocket area for receiving a radially inner margin of a tire side wall simulating ring member, the offset radially outer margin being return bent and extended in a radially outwardly axially inwardly direction in overlying relation to the axial cover portion to decrease the cover pocket area generally at the radially outer end of the cover margin as compared to the cover pocket area at the junction of the cover margin with the axial cover portion, and a tire side wall simulating ring member having an inner ring margin for confronting the tire rim and an outer margin for confronting a tire, the inner ring margin comprising a thickened bead engaged in retained assembly in said cover pocket area.

4. A cover structure including a cover member for retained disposition on a tire rim of a vehicle wheel, the cover member having a generally radially outwardly extending cover portion terminating in an offset radially outer cover margin, the offset radially outer cover margin being adapted to confront a radially outermost radial rim flange of the tire rim and being separated from the generally radially outwardly extending cover portion by an axially outwardly extending cover portion disposed at the radially inner end of said radially outer cover margin, circumferentially spaced resiliently deflectable retaining extensions turned radially outwardly from the axially outwardly extending cover portion for cover retaining engagement with a terminal rim flange of the tire rim and concealed by said offset radially outer cover margin, said extensions as well as said axial cover portion and said radially outer margin defining a cover pocket area for receiving a radially inner margin of a tire side wall simulating ring member, the offset radially outer margin being return bent and extended in a radially outwardly axially inwardly direction in overlying relation to the axial cover portion to decrease the cover pocket area generally at the radially outer end of the cover margin as compared to the cover pocket area at the junction of the cover margin with the axial cover portion, and a tire side wall simulating ring member having an inner ring margin for confronting the tire rim and an outer margin for confronting a tire, the inner ring margin comprising a thickened bead engaged in retained assembly in said cover pocket area.

5. A cover member for retained disposition on a tire rim of a vehicle wheel, the cover member having a generally radially and axially outwardly extending main cover portion terminating in an offset radially outer cover margin, the offset radially outer cover margin being adapted to confront a radially outermost radial rim flange of the tire rim and being separated from the generally radially outwardly extending cover portion by an axially outwardly extending cover portion disposed at the radially inner end of said radially outer cover margin and which axially outwardly extending cover portion is connected at its axially inner end to the main cover portion, and circumferentially spaced resiliently deflectable retaining extensions turned radially outwardly from the axially outwardly extending cover portion for cover retaining engagement with a terminal rim flange of the tire rim and concealed by said offset radially outer cover margin, the extensions being extended radially and axially outwardly generally in alignment with the main cover portion, the extensions having radially outwardly facing rim engaging terminal edges spaced axially inwardly of the radially outer margin and being cooperable with said extensions as well as said axial cover portion and said radially outer margin in defining a cover pocket area for receiving a radially inner margin of a tire side wall simulating ring member.

6. The cover member of claim 5 further characterized by a tire side wall simulating ring member having a radially inner margin comprising a thickened bead engaged in retained assembly in said cover pocket area, the extensions being engaged and backed up by the bead except at the area of the radially outwardly facing rim engaging terminal edges thereby enabling the terminal edges to be deflected free of the bead in the assembly of the cover and the ring member on the wheel.

7. The wheel structure of claim 1 further characterized by the axially outwardly extending cover portion as well as the radially inner end of said extensions being disposed axially of the radially inner end of the terminal rim flange and with the extensions being deflectable relative to the axially outwardly extending cover portion.

8. In a wheel structure including a tire rim having a radial rim flange as well as an axially extending terminal rim flange and a tire carried on the tire rim, a cover structure for retained disposition on the tire rim including a radially inner cover member and a tire side wall simulating ring member, the cover member having a generally radially outwardly extending cover portion terminating in an offset radially outer cover margin, the offset radially outer cover margin confronting the radial rim flange and being separated from the generally radially outwardly extending cover portion by an axially outwardly extending cover portion disposed at the radially inner end of said offset radially outer cover margin, and circumferentially spaced resiliently deflectable retaining extensions including notched areas dividing each of the extensions and providing them with rim engaging terminals, the extensions being turned radially outwardly from the axially outwardly extending cover portion for cover retaining engagement with the terminal rim flange and concealed by said members, the ring member being bridged over the terminal rim flange and having a radially outer ring margin engaged against the tire and a radially inner thickened ring margin retainingly engaged in a cover pocket area defined by said extensions as well as said axial cover portion and said offset radially outer cover margin, the thickened ring margin being engaged against extensions except at the area of the rim engaging terminal and with the thickened rim margin being spaced from the terminal rim flange, the ring member having a swingable portion fulcrumed on the radially outer cover margin flexible away from the wheel to allow a pry-off tool to be engaged between the terminal rim flange and the thickened ring margin and into the notched area for prying the extensions out of engagement with the tire rim to free the cover structure from the wheel.

9. The wheel structure of claim 1 further characterized by the cover member comprising a metallic ring member and with the cover structure including a metallic cover disposed radially inwardly of the metallic ring member in retained assembly on a body part of a wheel.

10. A cover structure including a cover member for retained disposition on a tire rim of a vehicle wheel, the cover member having a generally radially outwardly extending cover portion terminating in an offset radially outer cover margin, the offset radially outer cover margin being adapted to confront a radially outermost radial rim flange of a tire rim and being separated from the generally radially outwardly extending cover portion by an axially outwardly extending cover portion disposed at the radially inner end of said radially outer cover margin, and circumferentially spaced resiliently deflectable retaining extensions turned radially outwardly from the axially outwardly extending cover portion with the extensions and the cover margin being axially spaced and extending radially outwardly generally in converging relation for cover retaining engagement with a terminal rim flange of a tire rim, the resiliently deflectable retaining extensions being disposed generally in axial alignment with the offset radially outer cover margin and being concealed by said offset radially outer cover margin, the converging extensions and said radially outer cover margin cooperating with said axial cover portion in defining means comprising a cover pocket area for receiving and sustaining a radially inner margin of a tire side wall simulating ring member therein to secure the cover member and a tire side wall simulating ring member in assembly together on a vehicle wheel.

11. The cover structure of claim 10 further characterized as including a tire side wall simulating ring member, the ring member having a radially inner margin engaged in said cover pocket area with the converging extensions and the radially outer cover margin coacting with the ring margin to sustain the cover member and the ring member in assembly together.

References Cited in the file of this patent

UNITED STATES PATENTS 2,857,211 Lyon _____ Oct. 21, 1958

FOREIGN PATENTS 1,061,278 France _____ Nov. 25, 1953